United States Patent
Takagi

(10) Patent No.: US 6,310,460 B1
(45) Date of Patent: Oct. 30, 2001

(54) APPARATUS AND METHOD FOR CHANGING BUS LINE ADDRESS FOR A DETACHABLE BATTERY UNIT

(75) Inventor: Atsushi Takagi, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/618,843

(22) Filed: Jul. 18, 2000

(30) Foreign Application Priority Data

Jul. 28, 1999 (JP) .................................................. 11-214360

(51) Int. Cl.[7] ........................................................ H02J 7/00
(52) U.S. Cl. ............................................................ 320/106
(58) Field of Search ................................ 320/106; 702/63

(56) References Cited

U.S. PATENT DOCUMENTS

| | | | |
|---|---|---|---|
| 5,162,721 | * 11/1992 | Sato ...................................... | 320/106 |
| 5,300,874 | * 4/1994 | Shimamoto et al. ................. | 320/106 |
| 5,606,242 | * 2/1997 | Hull et al. ............................ | 320/106 |
| 5,796,239 | * 4/1997 | van Phuoc et al. .................. | 320/106 |
| 6,025,698 | * 8/1998 | Kim et al. ............................ | 320/106 |

* cited by examiner

*Primary Examiner*—Peter S. Wong
*Assistant Examiner*—Pia Tibbits
(74) *Attorney, Agent, or Firm*—Oblon, Spivak, McClelland, Maier & Neustadt, P.C.

(57) ABSTRACT

A bus line address changing apparatus for use in an electronic instrument including a plurality of battery unit attaching sections configured to accommodate a plurality of battery units respectively composed of at least one battery. A bus line receives a communication signal from at least one battery unit. A body side controller receives the communication signal from the at least one battery unit via the bus line. A bus line address storing device stores a plurality of bus addresses allocated for and corresponding to the plurality of battery unit attaching sections. In addition, a bus address selecting and setting device is provided to select and set one of bus addresses according to the battery unit attaching section when the battery unit is attached to the electronic instrument and electrically connected to the bus line.

21 Claims, 7 Drawing Sheets

BACKGROUND ART FIG. 4
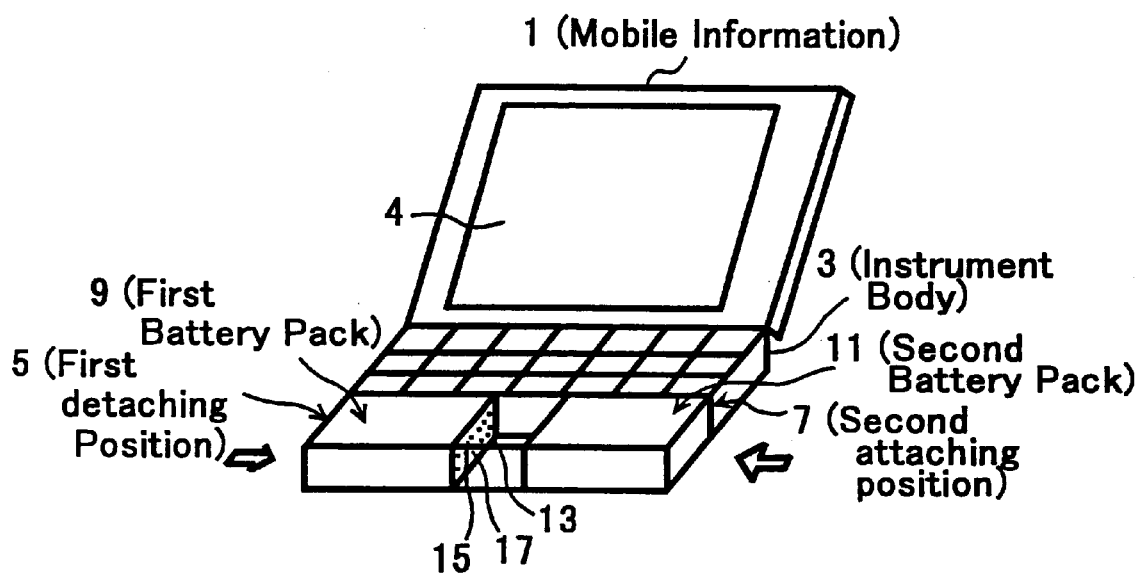

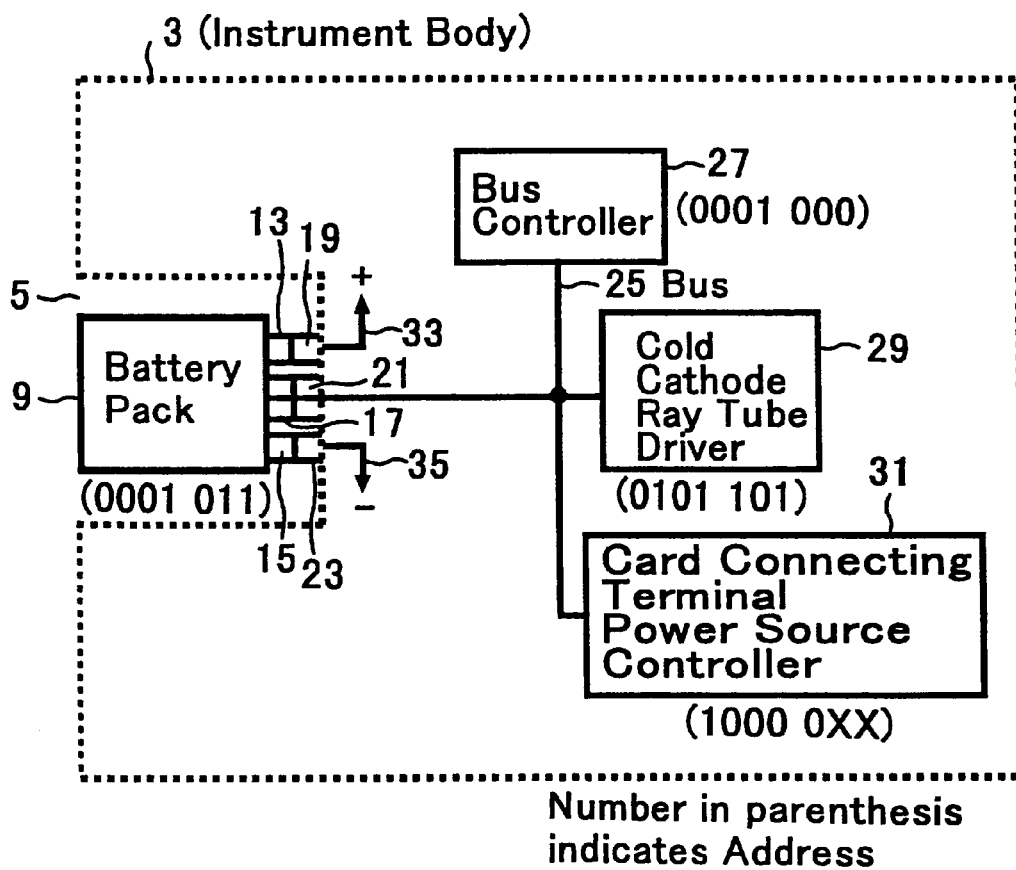
BACKGROUND ART FIG. 5
Number in parenthesis indicates Address

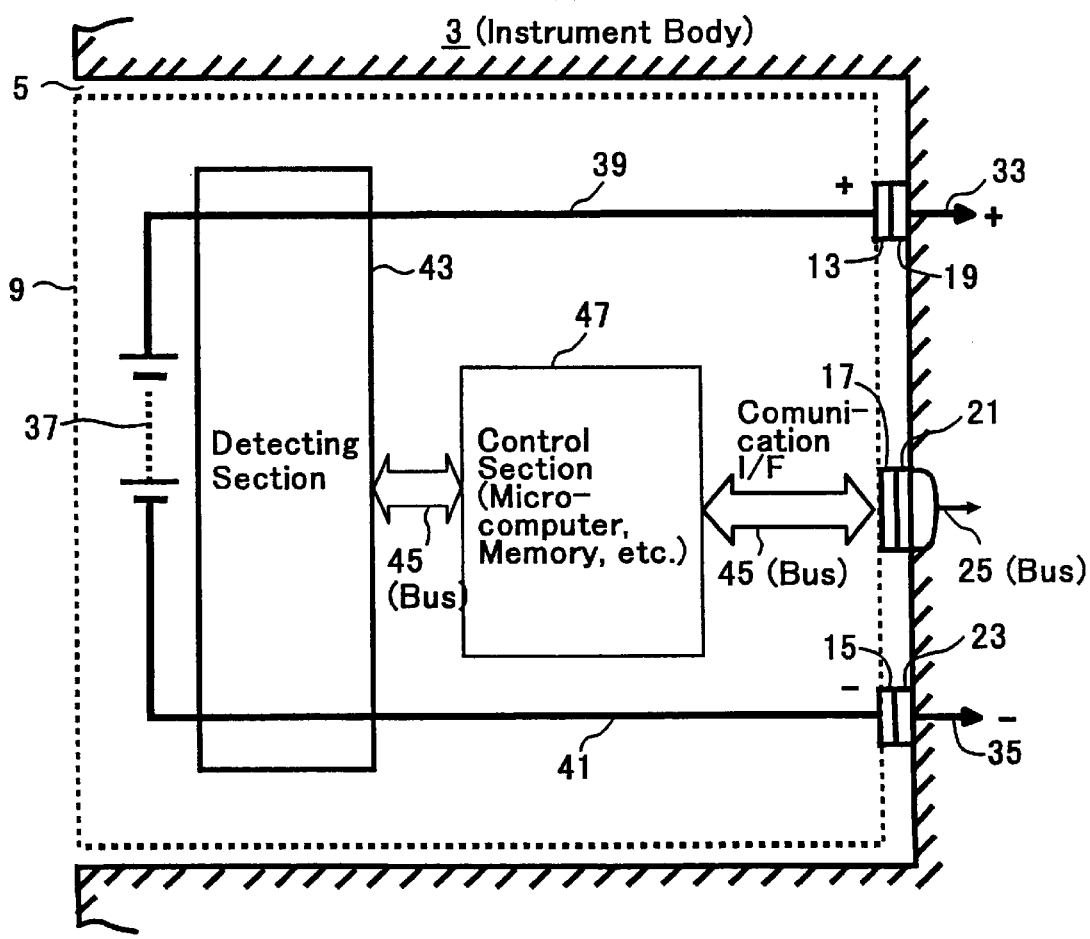
BACKGROUND ART FIG. 6

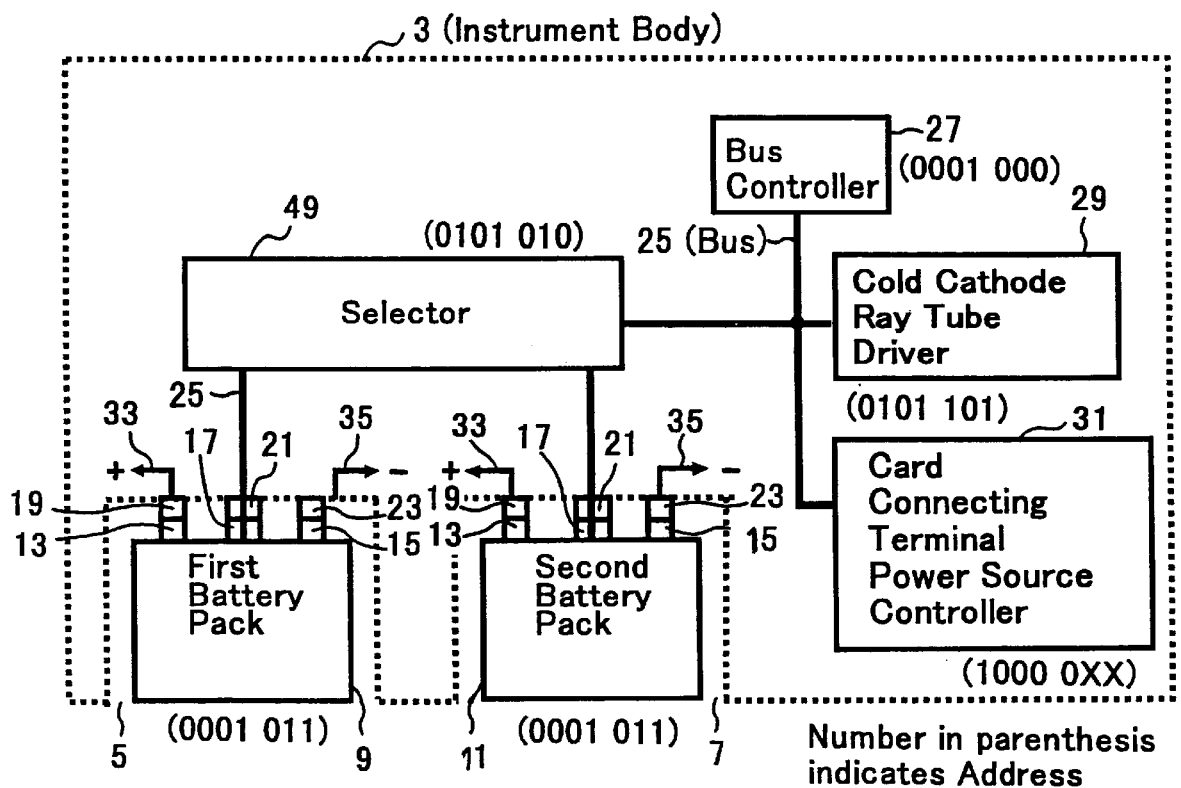
BACKGROUND ART FIG. 7

APPARATUS AND METHOD FOR CHANGING BUS LINE ADDRESS FOR A DETACHABLE BATTERY UNIT

CROSS REFERENCE TO RELATED APPLICATIONS

This document claims priority under 35 USC §119 to Japanese Patent Application No. 11-214360 filed on Jul. 28, 1999, the entire contents of which hereby incorporated herein by reference.

BACKGROUND OF THE INVENTION

1. Field of the Invention

The present invention generally relates to an electronic instrument, such as a notebook type personal computer, which includes a plurality of battery packs connectable to a bus line provided in a body of the electronic instrument and which is capable of displaying a remaining battery load, and in particular, relates to a bus line address changing apparatus for changing a bus line address separately set and stored in each battery pack.

2. Discussion of the Background

An electronic instrument, such as a notebook type personal computer, utilizing a battery pack as a driving power source, is well known. Namely, such an electronic instrument includes a function of displaying a remaining load on a display section of its body by connecting a battery to a bus line provided in the body. An electronic instrument capable of utilizing a plurality of such battery packs for prolonging an operational time period and displaying a remaining load of the battery has been also known.

A background electronic instrument, such as a notebook type personal computer, as one example of a mobile information instrument, is illustrated in FIG. 4, and is provided with a body (hereinafter referred to as an instrument body) 3 having a keyboard and similar devices, and a displaying section 4 pivotally and openably supported with respect to the instrument body 3. The electronic instrument 1 sometimes includes a first battery pack 9 in a first attaching section 5, composed of a slot or similar devices, provided at a front end of the instrument body 3, and a second battery pack 11 in a second attaching section 7, e.g., a slot.

Thus, the electronic instrument 1 is driven by receiving power supplied from both of the battery packs 9 and 11. The battery packs 9 and 11 each respectively includes a pack side plus terminal 13, a pack side minus terminal 15, and a pack side communication terminal 17 for communicating with a bus line of the instrument body 3.

An indication of the power of the battery packs 9 and 11 is supplied to the instrument body 3 and a remaining power or similar information of the battery packs 9 and 11 is transmitted to the instrument body 3, when each terminal 13, 15, and 17 is connected to a later mentioned corresponding terminal provided in the instrument body 3. The instrument body 3 receives and displays the remaining load on an LCD or similar device in the display section 4. The battery packs 9 and 11 respectively each have substantially a similar constitution which allows the electronic instrument 1 to execute an ordinal operation. Thus, when both battery packs 9 and 11 are attached to the instrument body 3 and are used, an operational time period of the instrument body 3 driven by the battery packs 9 and 11 can be prolonged when compared with a case that only one battery pack is attached to the instrument body 3.

Furthermore, an electronic instrument in which only one battery pack is attached to the instrument body 3 and another is detached from its attaching section is known. In such a device, a driving device for a floppy disk or a CD-ROM is attached to the attaching section if the operational time period of the instrument body 5 is not required to be prolonged.

Further, in a background art using only one battery pack as illustrated in FIG. 5, a serial bus line 25 acting as a transmitting bus line, such as a system management bus line (hereinafter referred to as a SM bus line), for transmitting a communication signal and communication data, and a controller 27 for controlling the bus line 25, are provided in the instrument body 3. Further, a body side plus terminal 19 and a body side minus terminal 23 are provided in the first attaching section 5 of the instrument body 3 as a plus terminal and a minus terminal of the instrument body, respectively.

A body side communication terminal 21 for allowing transmission of a communication signal, communication data, and similar information with the battery pack 9 is also provided in the instrument body 3. The body side plus terminal 19 is connected to a plus side power source line 33, the body side minus terminal 23 is connected to a minus side power source line 35, and the body side communication terminal 21 is connected to the bus line 25.

In such an electronic instrument of the background art, a sequential number written in the parenthesis in FIG. 5 is utilized and represents a bus line address for an applicable device connected to the bus line 25. For instance, the bus line controller 27 (with address 0001 000) recognizes that the battery pack 9, which is one of the devices connected to the bus line 25, has an address (0001 011). A communication signal and similar information transmitted to the bus line controller 27 from the battery pack 9 may include the bus line address (0001 011). Thus, the bus line controller 27 can surely identify a communication signal transmitted from the battery pack 9 referring to the bus line address (0001 011) included in the communication signal, even if a variety of communication signals are transmitted to the bus line controller 27 from each device via the bus line 25 commonly used by the plurality of devices.

As examples of a device supplied with a power source, for instance, under control of the bus line controller 27, a cold cathode ray tube driver 29 (with address 0101 101) for illuminating a display section 4, such as a LCD, from an inside of the instrument body 3, and a card connecting terminal power source controller 31 (with address 1000 0xx), such as a PCMCIA (Personal Computer Memory Card International Association) socket, are connected to the bus line 25.

When the battery pack 9 is attached to the first attaching section 5 of the instrument body 3, each terminal 13, 15, and 17 is electrically connected to each terminal 19, 23, and 21 oppositely arranged in the instrument body 3, respectively. When the battery pack 9 and the instrument body 3 are electrically conducted in such a manner, the instrument body 3 can be supplied with electrical power from the battery pack 9 via the coupling of terminals 13 and 15, and the coupling of terminals 19 and 23. In addition, information, such as remaining load of the battery pack 9, can be transmitted to the instrument body 3 via the terminals 17 and 21.

As illustrated in FIG. 6, the battery pack 9 includes a battery 37 including a charge-impossible battery as a primary battery, such as a manganese battery or an alkaline battery, and a chargeable battery as a secondary battery, such as a nickel cadmium battery or a lithium battery, connected with each other in parallel or serially, in addition to the above-mentioned pack side plus and minus terminals 13 and 15, and the pack side communication terminal 17.

Further, a detecting section 43 for detecting a voltage or an output current or the like generated between both poles of the battery 37, an arithmetic element, such as a microcomputer, and a memorizing element, such as a memory (each not shown), are provided in the battery pack 9. The arithmetic element may calculate a remaining load of the battery 37 as a result of detection, executed by the detecting section 43, of the voltage or output current, for example, generated between the both poles of the battery 37. The arithmetic element may also control the detecting section 43 and communication of signals in a prescribed manner.

A control section 47 may have a memory for storing a bus line address (0001 011) and so on, and a bus line 45 acting as a transmission path 45 connecting the control section 47 with the detecting section and with the pack side communication terminal 17 for communicating a communication signal and similar information. The battery pack 9 may further include a plus side power source line 39 constituting a transmitting path for a power source current of the plus pole side, and a minus side power source line 41 constituting a transmitting path for a power source current of the minus pole side.

FIG. 7 illustrates an interior constitution of an instrument body 3 of the related electronic instrument to which two battery packs are attached. The first battery pack 9 is attached to the first attaching section 5 as illustrated in FIG. 5. In addition, the second battery pack 11 is attached to the second attaching section 7. Further, a selector 49, composed of a semiconductor switch or a similar device is added to a portion of the bus line 25, for selectively communicating a communication signal, such as remaining load, transmitted from the first and second battery packs 9 and 11 to the bus line controller 27.

Owing to the selector 49, either the communication signal representing the remaining load of the first battery pack 9 or that of the second battery pack 11 is transmitted to the bus line controller 27. The reason why both the communication signals representing these remaining loads can not simultaneously be transmitted and selectively transmitted to the bus line controller 27 is as follows. If these communication signals are simultaneously transmitted on a same bus line 25, a conflict of addresses occurs because both addresses for the first battery pack 9 and the second battery pack 11 are generally the same (e.g. 0001 011),. In other words, since the addresses for the battery packs 9 and 11 illustrated in FIG. 7 are the same, the bus line controller 27 cannot discriminate the above-noted communication signals, unless the selector 49 selects one of these bus line addresses and changes.

In addition, this causes a probability of an erroneous operation and an overdriving of the bus line controller 27. Then, the selector 49 may select a communication signal, and transmit the selected communication signal to the bus line controller 27 so that the bus line controller 27 does not erroneously operate and overdrive.

Further, an additional problem occurs such that a hardware construction of the instrument body 3 and a control use software for the bus line controller 27 and similar devices become complex due to having to provide the selector 49 in the instrument body 3. To resolve such problems, it is possible to simply differentiate addresses for the battery packs 9 and 11, respectively.

However, the bus line controller 27 cannot recognize a battery pack attached to each attaching section if a bus line address as an ID for discrimination of each battery pack is optionally changed at the battery pack side because the bus line controller 27 generally recognizes that a bus line address of a device, i.e., a battery pack 9, attached to the first attaching section 5 is (xxxx xxx), and that of the battery pack 11 attached to the second attaching section 7 is (yyyy yyy). Accordingly, when an address for each battery pack is differentiated at the battery pack side, an address for a battery pack attached to the first attaching section 5 should be limited to (xxxx xxx), and that for a battery pack attached to the second attaching section 7 should be limited to (yyyyy yyy).

However, when a bus line address for each battery pack 9 and 11 is differentiated (at the battery pack side), a single battery cannot be used for both the battery packs, i.e. both of the battery packs respectively cannot be equally constituted and common. This may result in requiring two kinds of battery packs when designing, producing, distributing, and stocking, and may be a cause of increasing cost of the electronic instrument.

SUMMARY OF THE INVENTION

The present invention has been made in view of the above-noted and other problems and one object of the present invention is to address and resolve such problems.

A further object of the present invention is to provide a novel bus line address changing apparatus for use in an electronic instrument including a plurality of battery unit attaching sections configured to accommodate a plurality of battery units respectively composed of at least a battery.

The novel bus line address changing apparatus may include a bus line configured to receive a communication signal from at least one battery unit. A body side controller is configured to receive the communication signal from at least one battery unit via the bus line. A bus line address storing device is configured to store a plurality of bus addresses allocated for and corresponding to the plurality of battery unit attaching sections. A bus address selecting and setting device is configured to select and set one of the bus addresses according to the battery unit attaching section when the battery unit is attached and electrically connected to the bus line.

In another embodiment, the bus line address selecting and setting device may include a detecting device provided in each battery unit and configured to detect at least a voltage differently set in the electronic instrument corresponding to each battery attaching section, and a selecting device configured to select one of the bus addresses corresponding to the detected voltage.

In yet another embodiment, the bus address-storing device is provided in each battery unit.

In yet another embodiment, the battery units respectively each include a communication controller configured to transmit the communication signal with a selected and set bus address to the body side controller.

In yet another embodiment, the battery units respectively each include a battery load detecting device configured to detect remaining battery load, and the battery information to be transmitted to the body side controller includes the remaining battery load.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 4 is a perspective view illustrating an entire constitution of one example of the electronic instrument to which the present invention can be applied;

FIG. 5 is a block chart illustrating an interior constitution of a principal part of a background electronic instrument;

FIG. 6 is a block chart illustrating an interior constitution of a background battery pack; and FIG. 7 is a block chart illustrating an interior constitution of a principal part of a background electronic instrument.

DETAILED DESCRIPTION OF THE PREFERRED EMBODIMENT

Figure 1:
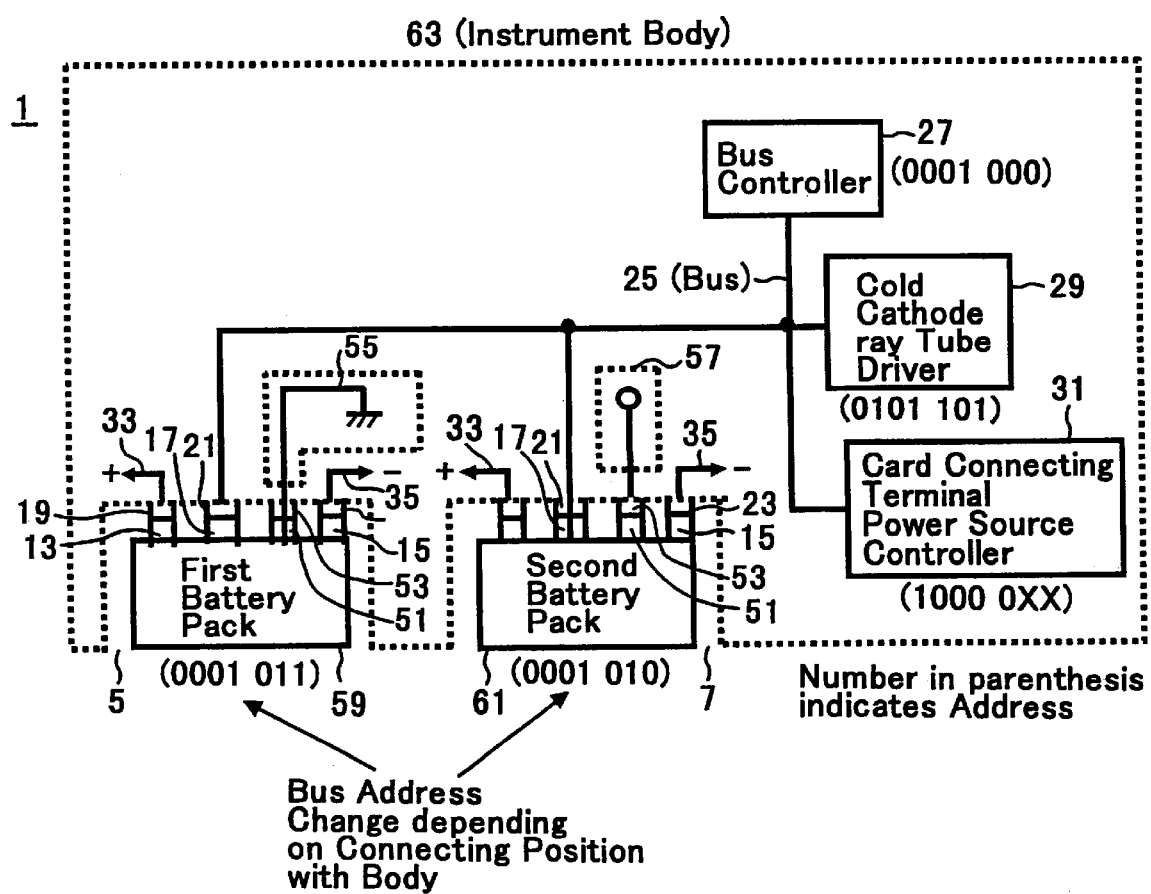
FIG. 1 is a block chart illustrating an interior constitution of a principal portion of an electronic instrument of the first embodiment according to the present invention.

Referring now to the drawings, wherein like reference numerals and marks designate identical or corresponding parts throughout several views, in FIG. 1 an electronic instrument of a first embodiment of the present invention may be provided with a pair of body side detection terminals 53 disposed in first and second attaching sections 5 and 7, respectively. Such body side detection terminals 53 may detect different voltages as information for determining corresponding bus line addresses for respective battery packs 59 and 61.

Figure 2:
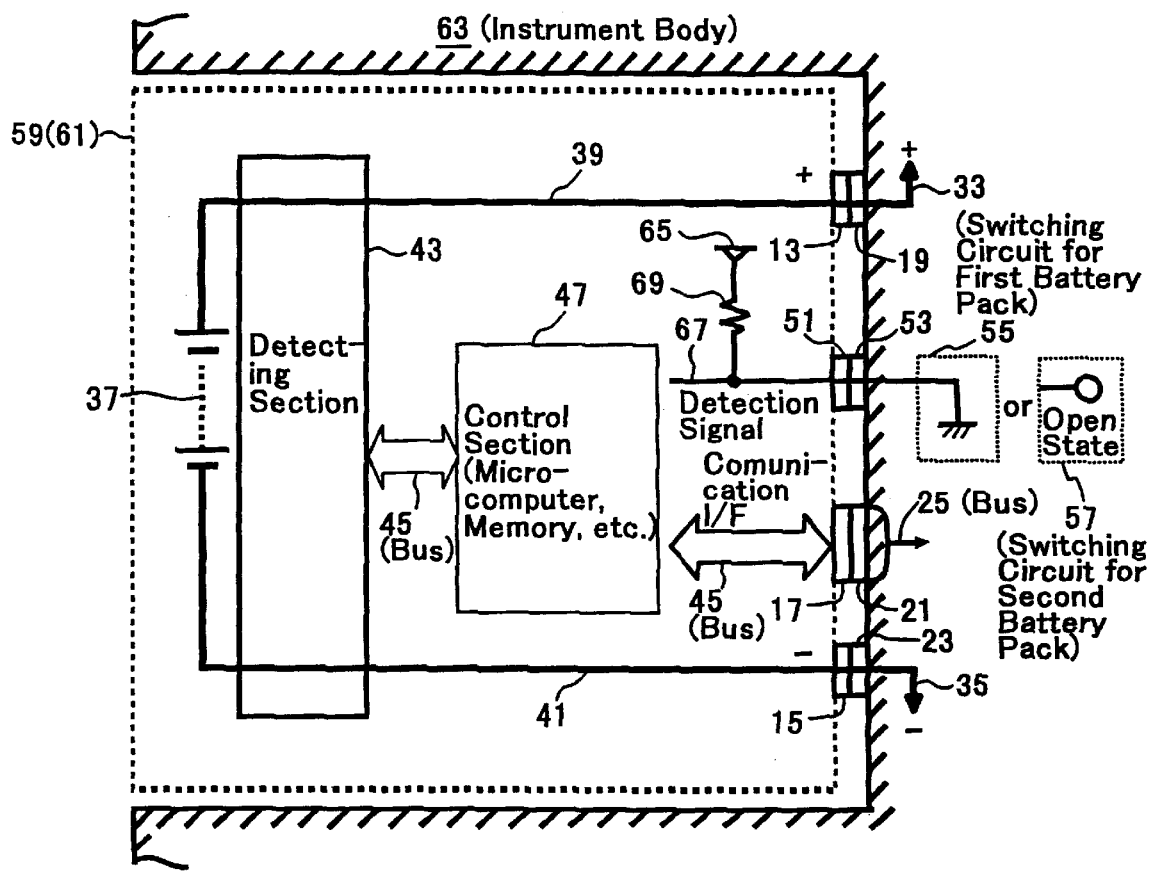
FIG. 2 is a block chart illustrating an interior constitution of a battery pack of the first example attached to the electronic instrument illustrated in FIG. 1 according to the present invention.

Further, a first changing circuit 55 for a first battery pack 59 use (grounded circuit) connecting to the body side detection terminal 53 may be provided adjacent to the first attaching section 5. A second address changing circuit 57 for a second battery pack 61 use (open terminal) connecting to the body side detection terminal 53 may be provided adjacent to the second attaching section 7. A pair of pack side detection terminals 51 are provided in the first and second battery packs 59 and 61 at sections opposing the body side terminals 53, respectively. As illustrated in FIG. 2, a memory and similar devices may be provided in the control section 47 of each battery pack 59 and 61, and may store a pair of bus line addresses, e.g., (0001 011) selected and set when the battery pack 59 (61) is attached to the first attaching section 5, and e.g., (0001 010) selected and set when the battery pack 59 (61) is attached to the second attaching section 7.

A pull-up resistor 69 for pulling up a voltage of the pack side detection terminal 51 may be connected between a power source line 65 and the pack side detection terminal 51, and both the pack side detection terminal 51 and the control section 47 are connected with each other via a connecting line 67 in each battery pack 59 and 61. Accordingly, a value of a voltage of the pack side detection terminal 51 induced when a battery pack is not attached to the instrument body 63 may be determined from both a resistance value of the pull-up resistor 69 and the value of a voltage of the power source line 65. Further, the voltage value of the pack side detection terminal 51 may be detected by the control section 47.

Even though both the first and second battery packs 59, 61 are distinctively described from a point of explanation of a convenient view, each interior constitution of the battery packs 59, 61 is substantially the same.

The address changing circuit 57 may be configured to determine a bus line address (0001 010) for the battery pack 61 attached to the second attaching section 7. The changing circuit 55 may be configured to generate a bus line address (0001 011) for the battery pack 59 attached to the first attaching section 5. Specifically, the changing circuit 55 may be a grounding circuit for setting the voltage value of the pack side detection terminal 51 to zero by grounding when the battery pack 59 is attached, and the address changing circuit 57 may be an open circuit for keeping the voltage value of the pack side detection terminal 51 as it is when the battery pack 61 is attached.

The other constitutional elements of the electronic instrument 1 and the battery pack 59 illustrated in FIGS. 1 and 2 may be substantially the same as the corresponding elements in the background art illustrated in FIGS. 5 to 7.

When the first battery pack 59 is attached to the first attaching section 5, the battery pack side detection terminal 51 thereof connects to the body side detection terminal 53, and thereby the voltage of the battery pack side detection terminal 51 lowers to zero volts by being grounded through changing circuit 55. To the contrary, when the second battery pack 61 is attached to the second attaching section 7, the battery pack side detection terminal 51 thereof connects to the body side detection terminal 53, but the voltage of that battery pack side detection terminal 51 thereof is not lowered to zero by being connected to changing circuit 57, which is an open terminal. Namely, the voltage determined by both the power source line 65 and the resistance of the pull-up resistor 69 may be kept in the latter case.

The control section 47 of the first battery pack 59 may detect and recognize the voltage value of the detection terminal 51 as zero. Then, the control section 47 may select and set a bus address from the two different addresses (0001 010) and (0001 011) stored in its memory to select the address corresponding to the zero volts at its detection terminal 51, so that the address (0001 011) representing the battery pack 59 attached to the first attaching section 5 is included in a communication signal.

To the contrary, the control section 47 of the second battery pack 61 may detect and recognize the voltage value of the detection terminal 51 as maintained and not lowered to zero. Then, its control section 47 may select and set the address corresponding to a non-zero voltage at its detection terminal 51, so that the address (0001 010) representing a battery pack 61 attached to the second attaching section 7 from the different addresses (0001 010) and (0001 011) stored in its memory is selected to be included in a communication signal.

Accordingly, the bus line controller 27 can receive a communication signal and recognize whether the communication signal received is transmitted from the first battery pack 59 attached to the first attaching section 5 or is transmitted from the second battery pack 61 attached to the second attaching section 7.

As mentioned above, the first and second battery packs 59 and 61 are distinctively attached to the first and second attaching section 5 and 7, respectively. However, since both battery packs 59 and 61 have the same constitution, the first battery pack 59 can be attached to the second attaching section 7, and the second battery pack 61 can be attached to the first attaching section 5, for example. In that case, since the voltage of the detection terminal 51 is maintained and is not being lowered in the first battery pack 59 attached to the second attaching section 7, a bus line address (0001 010) representing a battery pack attached to the second attaching section 7 is selected and included in the communication signal. To the contrary, in that situation, since the voltage of the detection terminal 51 is lowered to zero in the second battery pack 61 attached to the first attaching section 5, a bus line address (0001 011) representing a battery pack attached to the first attaching section 5 is selected and is included in the communication signal.

Thus, according to this embodiment, since a bus line address for a battery pack is differentiated depending on its attaching sections 5 and 7, the bus line addresses do not conflict and each battery pack 59, 61 can be supervised together on the same bus line, even if the same constitutional battery pack is used. Therefore, a battery of a single construction can be attached to a plurality of attaching sections.

Figure 3:
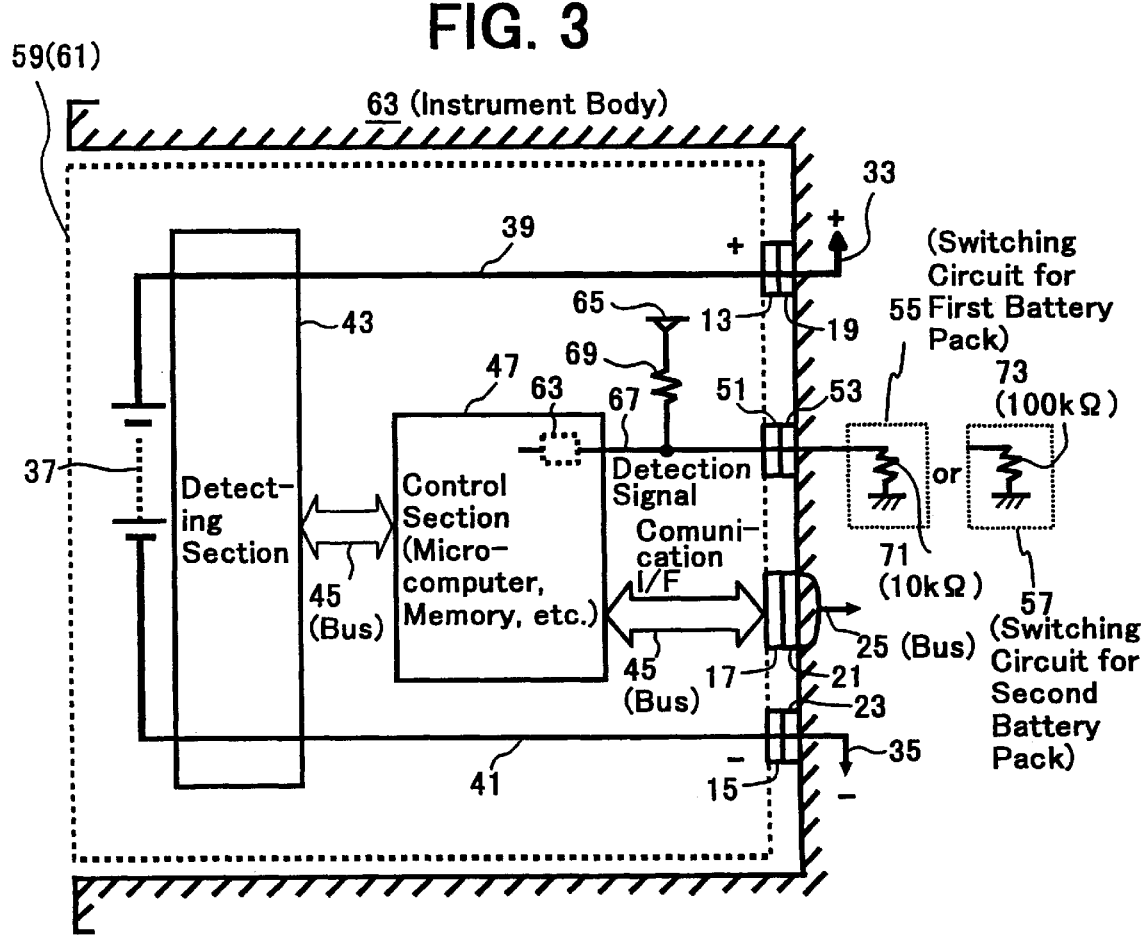
FIG. 3 is a block chart illustrating an interior constitution of a battery pack of the second example attached to the second embodiment according to the present invention.

The second embodiment of the present invention is now described referring to FIG. 3. FIG. 3 is a block chart illustrating an interior constitution of a battery pack attached to an electronic instrument of a type in which two battery packs are attached. As shown in FIG. 3, a control section 47 in each battery pack 59 and 61 may include a voltage discriminating (detecting) section 63 composed of an analog/digital (hereinafter referred to as an A/D) converter. A switching circuit 55 may be provided inside the first attaching section 5 of the instrument body 63. Such a switching circuit 55 may be composed of a first voltage-dividing resistor 71 of, e.g., 10 kilo-ohm connected between a body side detection terminal 53 and ground.

An address switching circuit 57 may be provided inside the second attaching section 7 of the instrument body 63. Such an address switching circuit 57 may be composed of a second voltage-dividing resistor 73 of, e.g., 100 kilo-ohm connected between the body side detection terminal 53 and ground. The other constitutional elements of the battery pack 59 and 61 illustrated in FIG. 3 may be the same as in the first embodiment.

In this embodiment, the voltage detecting section 63 in the control section 47 may detect voltages set by the pull-up resister 69 and the voltage dividing resisters 71 or 73 and induced at the connecting line 67 ranging from the power source line 65 to ground.

Thus, according to this embodiment, a disadvantage that the control section 47 simply detects a kind of voltage, i.e., ground voltage and open voltage, described in the first embodiment may be overcome because the control section 47 can detect a plurality of voltages, which are set by the pull-up resistor 69 and the voltage dividing resistor 71 or 73, and which range from the voltage of the power source line 65 and ground, in accordance with a number of battery attaching sections.

When a voltage caused by the first voltage dividing resistor 71 is detected, a control section 47 may properly select and set a bus address from the pair of bus addresses (0001 010) and (0001 011) stored in the memory so that the address (0001 011) representing a battery pack attached to the first attaching section 5 is selected and included in a communication signal transmitted therefrom.

Further, when a voltage caused by the second voltage dividing resistor 73 is detected, a control section 47 may properly select and set a bus address from the above mentioned pair of addresses so that the bus address (0001 010) representing a battery pack attached to the second attaching section 7 is included in a communication signal.

In this embodiment, not only can the voltage to be detected and set by the changing circuits 55 and 57 be optionally changed to a desired value as a result of being able to detect the optional voltage, but also a number of levels of voltage to be detected can be optionally increased corresponding to the number of attaching sections for attaching respective batteries. In that case, a number of bus line addresses to be stored may be also increasingly utilized according to an increase in the number of attaching sections. Specifically, when a number of the attaching sections is increased up to three, a new address (0001 001) may be stored in a memory of the control section 47 of a battery pack attached to the third attaching section in addition to the currently used addresses (0001 010) and (0001 011) for the battery packs attached to the first and second attaching sections, respectively. Further, a resistor of, e.g., 50 kilo-ohm may be utilized as a voltage dividing resistor of the changing circuit for the third battery pack.

Thus, in this embodiment using the bus line address changing apparatus, a voltage of the pack side detection terminal 51 of the first battery pack 59 may have a value divided by both the pull-up resistor 69 and the first voltage dividing resistor 71, when the first battery pack 59 is attached to the first attaching section 5. Similarly, the voltage of the pack side detection terminal 51 of the battery pack 61 may have a value divided by both the pull-up resistor 69 and the second voltage dividing resistor 73, when the second battery pack 61 is attached to the second attaching section 7.

Accordingly, since the bus line address of the battery pack is differentiated depending upon its attaching sections 5 and 7, the bus line address does not conflict and accordingly each battery pack 59, 61 can be supervised on the same bus line, even if the same constitutional battery pack is optionally attached to a plurality of attaching sections of the electronic instrument.

Further, even if a number of battery packs is increased, a bus line address for each battery pack can be readily differentiated according to each attaching section.

Further, the remaining charge can be included in the communication signal as information transmitted from a battery pack to the bus line controller of the instrument body.

Further, this invention is not limited to communicating such a remaining charge, and any condition of the battery pack such as voltage, current and temperature information, etc. can be included therein.

Further, constitutions of the pack side detection terminal 51 and the body side detection terminal 53 can be different from those of the pack side communication terminal 17 and the body side communication terminal 21.

Further, one of pins in the each pack side communication terminal 17 and the body side communication terminal 21 can be used as a pack side detection terminal 51 and a body side detection terminal 53, if both the terminals 17 and 21 are configured to include a plurality of pins.

Further, a bus line address can be properly changed by increasing or decreasing a number of signal lines connecting when the battery pack is attached to the attaching section.

Obviously numerous additional modifications and variations of the present invention are possible in light of the above teachings. It is therefore to be understood that within the scope of the appended claims, the present invention may be practiced otherwise than as specifically described herein.

What is claimed as new and desired to be secured by Letter Patent of the United States is:

1. A bus line address changing apparatus for use in an electronic instrument including a plurality of battery unit attaching sections configured to accommodate a plurality of battery units each respectively composed of at least one battery, comprising:

a bus line configured to receive a communication signal from at least one battery unit;

a body side controller configured to receive the communication signal from the at least one battery unit via the bus line;

a bus line address storing device configured to store a plurality of bus addresses allocated for and corresponding to the plurality of battery unit attaching sections; and, a bus address selecting and setting device configured to select and set one of the plurality of bus addresses according to the battery unit attaching section when the battery unit is attached and electrically connected to the bus line.

2. A bus line address changing apparatus according to claim 1, wherein said bus address selecting and setting device includes a detecting device provided in each battery unit and configured to detect at least one of a voltage or a current differently set in the electronic instrument corresponding to each battery attaching section, and a selecting device configured to select one of the bus addresses corresponding to the detected voltage or current.

3. A bus line address changing apparatus according to claim 1, wherein said plurality of battery units includes at least first and second batteries.

4. A bus line address changing apparatus according to claim 1, wherein said bus address storing device is provided in each battery unit.

5. A bus line address changing apparatus according to claim 1, wherein each of said plurality of battery units respectively includes a communication controller configured to transmit the communication signal with a selected and set bus address to the body side controller.

6. A bus line address changing apparatus according to claim 5, wherein each of said plurality of battery units respectively includes a battery charge detecting device configured to detect a remaining battery charge, and said battery information includes the remaining battery charge.

7. An electronic instrument including a plurality of battery unit attaching sections configured to accommodate a plurality of battery units each respectively composed of at least one battery, comprising:

a bus line configured to receive a communication signal from at least one battery unit;

a body side controller configured to receive the communication signal from the at least one battery unit via the bus line; and a bus line address changing device including a bus line address storing member configured to store a plurality of bus addresses allocated for and corresponding to the plurality of battery unit attaching sections, and including a bus address selecting and setting member configured to select and set one of the plurality of bus addresses according to the battery unit attaching section when the battery unit is attached and electrically connected to the bus line.

8. An electronic instrument according to claim 7, wherein said bus address selecting and setting device includes a detecting device provided in each battery unit and configured to detect at least one of a voltage or current differently set in the electronic instrument corresponding to each battery attaching section, and a selecting device configured to select one of the bus addresses corresponding to the detected voltage or current.

9. An electronic instrument according to claim 7, wherein said plurality of battery units include at least first and second batteries.

10. An electronic instrument according to claim 7, wherein said bus address storing device is provided in each battery unit.

11. An electronic instrument according to claim 7, wherein each of said plurality of battery units respectively includes a communication controller configured to transmit the communication signal with a selected and set bus address to the body side controller.

12. An electronic instrument according to claim 11, wherein each of said plurality of battery units respectively includes a battery charge detecting device configured to detect a remaining battery charge, and said battery information includes the remaining battery charge.

13. A bus line address changing method for use in an electronic instrument, comprising the steps of:

providing a plurality of battery unit attaching sections configured to accommodate a plurality of battery units respectively composed of at least one battery;

providing a bus line configured to receive a communication signal from at least one battery unit;

providing a body side controller configured to receive the communication signal from the at least one battery unit via the bus line;

providing a bus line address storing device configured to store a plurality of bus addresses allocated for and corresponding to the plurality of battery unit attaching sections; and, providing a bus address selecting and setting device configured to select and set one of the plurality of bus addresses according to the battery unit attaching section when the battery unit is attached and electrically connected to the bus line.

14. A bus line address changing method as claimed in claim 13, further comprising the steps of:

providing a detecting device in each battery unit configured to detect at least one of a voltage or a current differently set in the electronic instrument corresponding to each battery attaching section; and providing a selecting device configured to select one of the bus addresses corresponding to the detected voltage or current.

15. A bus line address changing method according to claim 13, further comprising the step of:

providing a communication controller configured to transmit the communication signal with a selected and set bus address to the body side controller in each battery unit.

16. A bus line address changing method according to claim 13, further comprising the steps of:

providing a battery charge detecting device configured to detect a remaining battery charge; and, including the remaining battery charge in said battery information.

17. An address changing apparatus for use in an electronic instrument including a plurality of battery unit attaching sections configured to accommodate a plurality of battery units each respectively composed of at least one battery, comprising:

transmitting means for transmitting a communication signal from at least one battery unit to the electronic instrument;

means for receiving the communication signal from the at least one battery unit via the transmitting means;

address storing means for storing a plurality of addresses allocated for and corresponding to the plurality of battery unit attaching sections; and, address selecting and setting means for selecting and setting one of the plurality of addresses according to the battery unit attaching section when the battery unit is attached and electrically connected to the transmitting means.

18. An address changing apparatus according to claim 17, wherein said address selecting and setting means includes detecting means provided in each battery unit for detecting at least one of a voltage or a current differently set in the electronic instrument corresponding to each battery attaching section, and selecting means for selecting one of the bus addresses corresponding to the detected voltage or current.

19. An address changing apparatus according to claim 17, wherein said address storing means are provided in each battery unit.

20. An address changing apparatus according to claim 17, wherein each of said plurality of battery units respectively includes communication-controlling means for transmitting the communication signal with a selected and set address to the communication signal receiving means.

21. An address changing apparatus according to claim 20, wherein said battery units respectively include battery charge detecting means for detecting a remaining battery charge, and said battery information includes the remaining battery charge.

* * * * *